United States Patent [19]
Ito

[11] 3,807,717
[45] Apr. 30, 1974

[54] SUSPENSION UNIT OF A MOTOR VEHICLE SUSPENSION SYSTEM

[75] Inventor: Naganori Ito, Tokyo, Japan

[73] Assignee: Nissan Motor Company, Ltd., Yokohama, Japan

[22] Filed: June 30, 1972

[21] Appl. No.: 267,924

[30] Foreign Application Priority Data
Oct. 18, 1971 Japan.............................. 46-81562

[52] U.S. Cl. .......................... 267/64 R, 267/DIG. 1
[51] Int. Cl. ............................................ B60g 11/26
[58] Field of Search ..................... 267/64 R, DIG. 1

[56] References Cited
UNITED STATES PATENTS

| | | | |
|---|---|---|---|
| 3,570,832 | 3/1971 | Ortheil ............................ | 267/64 R |
| 3,522,941 | 8/1970 | Biabaud .......................... | 267/64 R |
| 3,088,726 | 5/1963 | Dangauthier ..................... | 267/64 R |

*Primary Examiner*—Robert G. Sheridan
*Assistant Examiner*—Lawrence J. Oresky

[57] ABSTRACT

An improved strut type suspension unit for a motor vehicle suspension system is disclosed, including a cylinder filled with liquid under pressure, a piston axially slidable in the cylinder chamber, and a piston rod extending outwardly of the cylinder. The suspension unit is connected at one end to an axle of the vehicle wheel and at the other to an underbody structure of the motor vehicle. The pressure in the cylinder chamber is varied in a manner to cause the cylinder to be moved away from or toward the piston when the suspension unit is contracted or extended due to a change in the amount of load to be carried by the vehicle body. The suspension unit may be provided with means adapted to manually adjust the total length of the suspension unit and accordingly the road clearance of the motor vehicle and a hydropneumatic spring unit by which the vertical vibrations of the vehicle wheel can be absorbed without changing the relative positions of the parts and elements of the suspension unit.

19 Claims, 3 Drawing Figures

SUSPENSION UNIT OF A MOTOR VEHICLE SUSPENSION SYSTEM

The present invention relates to a suspension system of a motor vehicle and, more particularly, to a strut or suspension unit forming part of the motor vehicle suspension system.

An object of the present invention is to provide a suspension unit which is adapted to maintain the body structure of a motor vehicle at a constant level over the road surface irrespective of a change in the amount of load carried by the vehicle body.

Another object of the present invention is to provide a suspension unit having vehicle level adjusting means by which the load clearance of the motor vehicle can be adjusted manually depending upon the condition of the road surface.

Still another object is to provide a suspension unit having a spring unit by which the vertical vibrations of the vehicle wheel are absorbed without a change in the road clearance of the motor vehicle.

These objects of the present invention are accomplished basically in a strut or suspension unit comprising a cylinder chamber filled with liquid under pressure and a cylinder head which is formed with axially spaced fluid inlet and outlet ports, a piston axially slidably received in the cylinder chamber, a piston rod projecting from the piston and extending outwardly from the cylinder through one end of the cylinder opposite to the cylinder head, liquid pressure control means for selectively providing communication between the cylinder chamber and the fluid inlet and outlet ports depending upon the pressure of the liquid in the cylinder chamber, and biasing means for urging the liquid pressure control means to a neutral position in which the inlet and outlet ports in the cylinder head are isolated from the cylinder head. The fluid inlet port in the cylinder head communicates with a source of liquid under pressure. The cylinder chamber is brought into communication with the fluid inlet port in the cylinder head when the cylinder is moved relative to the piston in the cylinder chamber to cause the suspension unit to contract and with the fluid outlet port when the cylinder is moved relative to the piston to cause the suspension unit to increase its length. The suspension unit in its entirety is connected at one end to an axle for a vehicle wheel and at the other to the motor vehicle body structure.

The liquid pressure control means may comprise a valve spool which is axially slidable in the cylinder head and which has an axial passage providing liquid communication across the valve spool and an annular groove selectively providing liquid communication between the cylinder chamber and the fluid inlet and outlet ports in the cylinder head. The liquid pressure control means may further comprise passage means providing communication between the annular groove in the valve spool and the cylinder chamber. This passage means may comprise a sleeve axially slidable in the cylinder head and axially slidably receiving the valve spool therein. The sleeve is formed with axially spaced fluid inlet and outlet passages which are located intermediate between the fluid inlet and outlet ports in the cylinder head and selectively brought into alignment with these fluid inlet and outlet ports when the cylinder head is moved away from and toward the piston in the cylinder chamber respectively. In this instance, the biasing means of the suspension unit may comprise a first preload spring biasing the sleeve toward the piston in the cylinder chamber, a second preload spring biasing the valve spool toward the piston and a third preload spring biasing the valve spring away from the piston.

Or otherwise, the passage means may comprise a wall portion of the cylinder chamber wherein the wall portion is formed with a passage which is open at one end to the bore in the cylinder head and at the other to the cylinder chamber. In this instance the biasing means of the suspension unit may comprise a first preload spring biasing the valve spool toward the piston in the cylinder chamber and a second preload spring biasing the valve spool away from the piston.

The strut or suspension unit according to the present invention may further comprise vehicle adjusting means for increasing the pressure of the liquid in the cylinder chamber so as to increase the overall length of the suspension unit as a whole and decrease the liquid pressure to reduce the length of the suspension unit. The regulation of the liquid pressure in the cylinder chamber is effected by the aid of a control fluid regulator valve unit which is manually actuated whereby the road clearance of the motor vehicle can be varied in a simple manner.

The suspension unit may still further comprise a hydropneumatic spring unit which is adapted to absorb vertical vibrations of the vehicle wheel without changing the relative positions of the parts and elements of the suspension unit.

The other objects and advantages of the strut or suspension unit according to the present invention will become apparent from the following description in conjunction with the accompanying drawings, in which.

Figure 1:
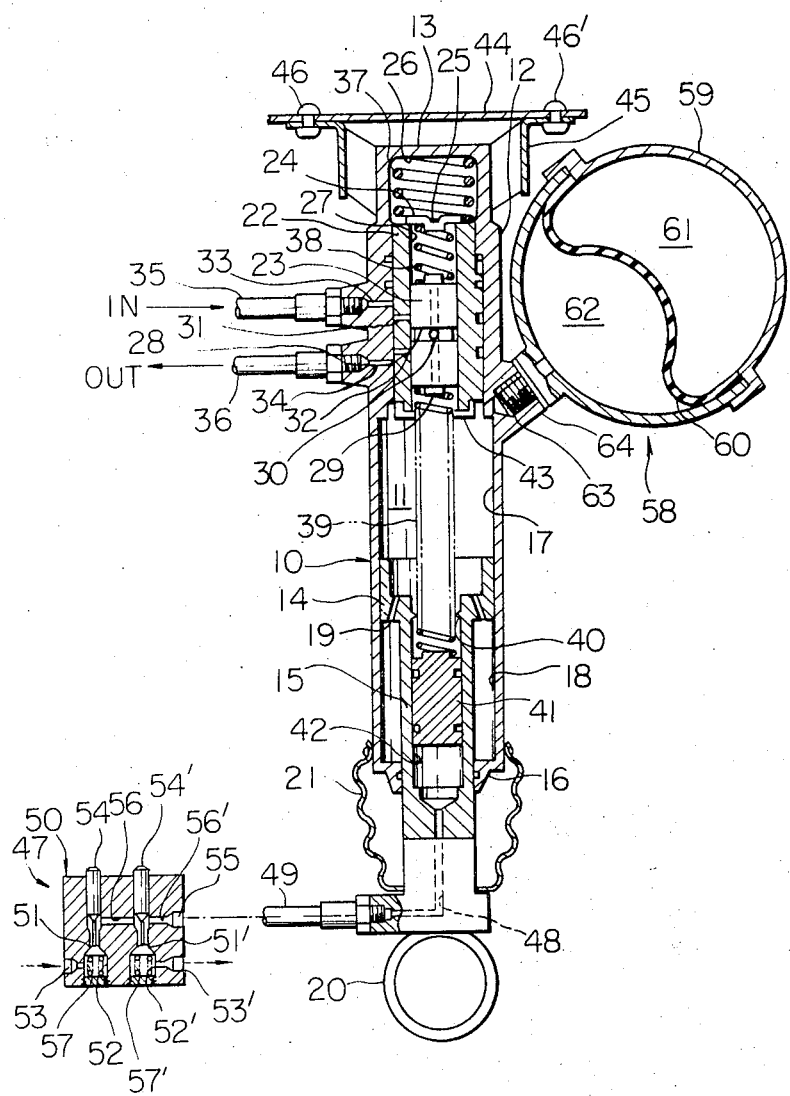
FIG. 1 is a longitudinal sectional view showing a preferred embodiment of the suspension unit according to the present invention.

Referring first to FIG. 1, the strut or suspension unit embodying the present invention has a cylinder 10 having a cylinder chamber 11 which is formed axially therein. A portion, which is shown as an upper end portion, of the cylinder 10 is a cylinder head portion 12 which is closed by an upper end wall 13. A piston 14 is axially slidably received in the cylinder bore 11. A piston rod or stem 15 projects from a lower face of this piston 14, extending outwardly of the cylinder 10 through a lower end wall or plug 16. Two separate compartments are thus formed on both sides of the piston 14 in the cylinder bore 11, one compartment 17 being defined between the upper face of the piston and the upper end wall 13 of the cylinder head 12 and the other compartment 18 being defined between the lower face of the piston 14 and the lower end wall 16 of the cylinder 10. These compartments 17 and 18 are filled with an incompressible fluid such as liquid. The piston 14 has formed therein a generally axially extending passage or passages 19 providing fluid communication across the piston, viz., between the upper and lower fluid compartments 17 and 18, respectively. The passage or passages 19 are intended to permit the working fluid in the two compartments 17 and 18 to flow from one to the other of these compartments so as to dampen the vibrations transferred to the strut or suspension unit from the vehicle wheel associated with the suspension unit. The piston rod 15 is hermetically received on an inner peripheral edge of the annular end wall 16 of the cylinder 10 through a hermetic seal (not numbered) and is slidable forwardly and backwardly through the annular end wall 16. This piston rod 15 has formed at its leading end a mounting eye 20 through which the piston rod is connected to wheel supporting means such as an axle (not shown). Designated by reference numeral 21 is a flexible dust cover which encloses the lower end portions of the cylinder 10 and the piston rod 15 for the purpose of preventing an ingress of dust into the cylinder chamber 11.

A sleeve 22 is axially slidably received in the bore in the cylinder head 12, having one or upper end spaced apart from the upper end wall 13 of the cylinder head and terminating at the lower end in the bore in the cylinder head merging into the upper fluid compartment 17. The sleeve 22, in turn, has axially slidably received therein a valve spool 23. Thus, the sleeve 22 is axially movable relative to the cylinder head 12 while the valve spool 23 is axially movable relative to the sleeve 22. The sleeve 22 is capped at its upper end by an end plug 24 having an orifice 25. Thus, the bore in the cylinder head 12 is divided into upper and lower fluid chambers 26 and 27, respectively, of which the upper chamber 26 is defined between the upper end wall 13 of the cylinder head 13 and the upper face of the end plug 24 and the lower fluid chamber 27 is defined between the lower face of the end plug 24 and the upper face of the valve spool 22. These upper and lower fluid chambers 26 and 27, respectively, communicate with each other through the orifice 25 in the end plug 24. The valve spool 22 has an annular groove 28 formed in its outer peripheral wall, an axial passage 29 extending from one end of the valve spool to the other, and a radial passage 30 providing communication between these annular groove 28 and axial passage 29. The annular groove 28 is surrounded by the inner peripheral wall surface of the sleeve 22 and the axial passage 29 provides fluid communication across the valve spool 23, viz., between the lower fluid chamber 27 in the cylinder head 12 and the upper fluid compartment 17 in the cylinder 10. The sleeve 22, on the other hand, has axially spaced upper and lower radial passages 31 and 32, respectively. The cylinder head 12 also has axially spaced upper and lower radial ports 33 and 34 which are located in axial alignment with the radial passages 31 and 32 in the sleeve 22 and at a spacing which is larger than the spacing between those passages 33 and 34. The radial ports 33 and 34 serve as inlet and outlet ports, respectively, for the working fluid in the cylinder 10, communicating with inlet and outlet conduits 35 and 36, respectively, as shown. The sleeve 22 and valve spool 23 are held in balanced positions by means of first, second and third preload or compression springs 37, 38 and 39, respectively. The first preload spring 37 is mounted in the upper fluid chamber 26 in the cylinder head 12, seated at one end on the inner face of the upper end wall 13 of the cylinder bore and at the other on the upper face of the end plug 24 of the sleeve 22. The second preload spring 38 is positioned in the lower fluid chamber 27 in the cylinder bore 12 and is seated at one end on the lower face of the end plug 24 and at the other on the upper face of the valve spool 23. The first preload spring 37 thus biases the sleeve 22 away from the upper end wall 13 of the cylinder head 12 while the second preload spring 38 biases the valve spool 23 away from the end plug 24 of the sleeve 22. In other words, both the sleeve 22 and valve spool 23 are biased downwardly, viz., toward the piston 14 in the cylinder chamber 11. The third preload spring 39, on the other hand, urges the valve spool 23 toward the end plug 24 against the force of the second preload spring 38. This third spring 39 is seated at one end on the lower face of the valve spool 23 and at the other on the upper face of the piston 14 though not illustrated as such. In the embodiment shown in FIG. 1, the piston rod 15 is internally hollowed so as to form an axial bore 40 which merges at its upper end into the lower fluid compartment 18 in the cylinder 10 and which is closed at its lowermost end by the leading end portion of the piston rod. The axial bore 40 in the piston rod 15 receives axially slidably a floating piston 41 by which an independent control fluid chamber 42 is defined between the lower end face of the floating piston 41 and the leading end portion of the piston rod. The provision of these axial bore 40 in the piston rod 15 and the floating piston 41 in such axial bore 40 is by preferance and, where such provision is preferred, the third preload spring 39 is seated at its lower end on the upper end face of the floating piston 41, as illustrated. The amounts of preload and spring constants of the first, second and third preload springs 37, 38 and 39, respectively should be selected in such a manner that the annular groove 28 in the outer peripheral wall of the valve spool 23 is located between the spaced radial grooves 31 and 32 in the sleeve 22 and at the same time these radial grooves 31 and 32, in turn, are located intermediate between the spaced radial ports 35 and 36 in the cylinder head 12 when the sleeve 22 is positioned as balanced relative to the cylinder head 12 and the valve spool 23 is positioned as balanced relative to the sleeve 22 as illustrated in FIG. 1. The sleeve 22 is provided with an inner annular flange 43 which is attached to the lower end edge of the sleeve, serving as a stop for the movement of the valve spool 23 away from the end plug 24 during operation of the strut or suspension unit. The strut or suspension unit as shown is securely connected to a structural member 44 of the motor vehicle through a bracket 45 secured to an upper end portion of the cylinder head 12. This bracket 45 is fastened to the structural member 44 of the motor vehicle thouse use of suitable fastening means such as bolts or studs 46 and 46' as illustrated.

The provision of the floating piston 41 and control fluid chamber 42 in the bored piston rod 15 is intended, as preferred, so as to provide manual control of the overall length of the strut or suspension unit, viz., the road clearance between the underbody structure of the motor vehicle and the road surface. Thus, the control fluid chamber 42 communicates with a level control fluid regulator valve unit 47 through a passage 48 formed in the lower end portion of the piston rod 15 and through a conduit 49 leading from the passage 48. The level control fluid regulator valve unit 47 may be constructed in any desired manner insofar as it is adapted to selectively permit and block passage of a fluid pressure to the conduit 49 when the valve unit is so actuated by human effort or in an automatic fashion. In the construction shown in FIG. 1 the regulator valve unit 47 includes a housing 50 of a casting and a pair of poppet valves 51 and 51' which are positioned in fluid chamber 52 and 52' communicating with fluid inlet and drain ports 53 and 53', respectively. These poppet valves 51 and 51' are connected to actuating rods 54 and 54', respectively, which are axially movably mounted in the housing 50 as illustrated. The fluid chambers 52 and 52' communicate with a fluid outlet port 55 through passages 56 and 56' formed in the housing 50. This outlet port 55, in turn, communicates with the conduit 49 leading from the fluid passage 48 in the lower end portion of the piston rod 15. Preload springs 57 and 57'8c are mounted in the fluid chambers 52 and 52' biasing the actuating rods 54 and 54' to positions in which the poppet valves 51 and 51' block communication between the fluid chambers 52 and 52' and passages 56 and 56', respectively. The communication between the fluid chambers 52 and 52' and the passages 56 and 56' is provided when the actuating rods 54 and 54' are depressed to overcome the spring forces of the springs 57 and 57' for moving the poppet valves 51 and 51' away from their valve seats, respectively.

The strut or suspension unit according to the present invention is shown as further comprising a hydropneumatic spring unit 58 which is provided by preference for the purpose of dampening the minute changes in the fluid pressure in the cylinder chamber 11. The hydropneumatic spring unit 58 includes a casing 59 which is internally divided by a flexible partition member 60 into separate chambers 61 and 62. The chamber 61 is totally closed by the flexible partition member 60 and is filled with a compressible fluid such as a nitrogen gas under pressure. The other chamber 62 communicates with the cylinder chamber 11 through a passage 63 formed in a tube 64 connecting the spring unit 58 to the cylinder 10. The chamber 62 is thus occupied with the liquid from the cylinder chamber 11.

Figure 2:
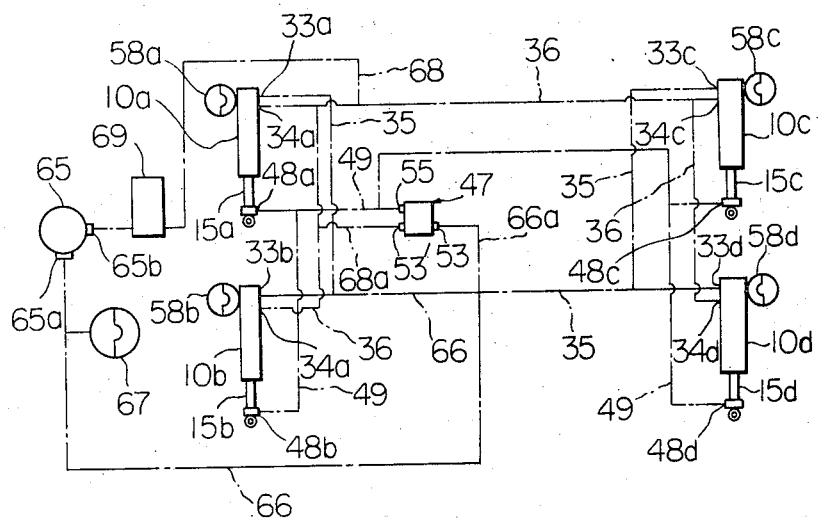
FIG. 2 is a schematic view showing a suspension system using the suspension unit shown in FIG. 1.

FIG. 2 illustrates an example of a piping arrangement in which the strut or suspension unit constructed as above described is applied to each of four independent vehicle wheels of a motor vehicle. Thus, four suspension units having cylinders 10a to 10d, piston rods 15a to 15d and hydropneumatic spring units 58a to 58d are seen in FIG. 2. These suspension units are mounted between the vehicle body structure and the four axles of the motor vehicle.

As illustrated in FIG. 2, the fluid inlet ports 33a to 33d formed respectively in the cylinders 10a to 10d communicate with a discharge side 65a of a hydraulic pump 65 though the above mentioned conduit 35 and a fluid supply pipeline 66. This fluid supply pipeline 66 also communicates with the fluid inlet port 53 of the level control fluid regulator valve unit 47 through a branch pipeline 66a branched from the fluid supply pipeline 66. The pipeline 66 may be preferably provided with a pressure accumulator 67 which is essentially similar to the hydropneumatic spring unit 58. The fluid outlet ports 34a to 34d formed in the cylinders 10a to 10d, respectively, communicate with a suction port 65b of the hydraulic pump 65 through a fluid discharge pipeline 68 in which a reservoir unit 69 is interposed. The fluid discharge pipeline 68 also communicates with the drain port 53' of the level control fluid regulator valve unit 47 through a branch pipeline 68a leading from the fluid discharge pipeline 68. The passage 48a to 48d formed in the lower end portions of the piston rods 15a to 15d, respectively, of the suspension units are in communication with the fluid outlet port 55 of the level control fluid regulator unit 47 through the conduit 49.

Turning back to FIG. 1, when the suspension unit which is maintained in the balanced condition as illustrated is subjected to an impact as during cruising of the motor vehicle on an irregular road surface, then the impact is transferred from the piston rod 15 and piston 14 to the liquid in the upper fluid chamber 17 in the cylinder 10. The fluid pressure is consequently imparted to the flexible partition member 60 of the hydropneumatic spring unit 47 through the passage 63 and liquid chamber 62 with the result that the gas in the chamber 61 is compressed so as to substantially compensate for the rise in the liquid pressure in the upper fluid chamber 17. The pressure in the chamber 17 is dampened by means of passage of the liquid between the upper and lower fluid chambers 17 and 18, respectively, through the passage 19 in the piston 14. Under this condition, the sleeve 22 is maintained substantially at rest because of the restriction on the flow of the liquid through the orifice 25 and because of the opposing force of the preload spring 13 so that the radial passages 31 and 32 in the sleeve 22 remain isolated from the associated radial ports 33 and 34, respectively, in the cylinder 10. The dynamic characteristics of the sleeve 22 can be selected suitably by varying the preload and spring constant of the spring 13 and the effective area of the calibrated orifice 25 in the end plug 24.

Under a condition in which the vehicle body carries an increased load, the strut as a whole is forced to contract in the axial direction with the cylinder 10 moved downwardly, viz., toward the axle carried by the mounting eye 20. This causes the valve spool 23 to move toward the apertured end plug 24 of the sleeve 22 by the compressive force of the spring 39 against the opposing spring force of the spring 38 in the sleeve 22 until the limit of compression of the latter spring is reached. The annular groove 28 in the valve spool 23 is consequently aligned with the upper radial passage 31 in the sleeve 22. The sleeve 22 is then moved in unison with the valve spool 23 toward the upper end wall 13 of the cylinder head 12 until the limit of the compression of the spring 37 is reached, when the upper radial passage 31 in the sleeve 22 is aligned with the fluid inlet port 33 in the cylinder head 12. Fluid communication is accordingly established between the conduit 35 and cylinder chamber 11 through the fluid inlet port 33, upper radial passage 31 in the sleeve 22, annular passage 28 and axial passage 29 in the valve spool 23. The liquid supplied from the hydraulic pump 65 (FIG. 2) is now passed to the cylinder chamber 11 with the result that the liquid pressure in the cylinder chamber 11 increases on both sides of the valve spool 23. Under this condition, the strut increases its total length with the cylinder 10 moved upwardly, viz., away from the axle until the sleeve 22 and valve spool 23 are brought into the balanced positions which are shown in FIG. 1. The vehicle body 44 is thus moved back to its initial position, thereby restoring the predetermined road clearance.

Under a condition in which the vehicle body carries a reduced load, on the contrary, the cylinder 10 is moved upwardly away from the axle so that the strut increases its total length. The valve spool 23 is consequently moved away from the end plug 24 of the sleeve 22 by reason of the compressive force of the spring 38 against the action of the spring 39 until the valve spool abuts at its lower end to the stop 43, thereby causing the annular groove 28 to be aligned with the lower radial passage 32 in the sleeve 22. Simultaneously, the sleeve 22 is moved away from the upper end wall 13 of the cylinder head 12 so that the lower radial passage 32 is brought into alignment with the associated fluid outlet port 34 in the cylinder head. The conduit 36 leading to the suction side of the hydraulic pump 65 (FIG. 2) is consequently permitted to communicate with the cylinder chamber 11 through the fluid outlet port 34 in the cylinder head 12, the lower radial passage 32 in the sleeve 22, the annular groove 28 and axial passage 29 in the valve spool 23. The liquid in the fluid compartment 17 and fluid chamber 27 is in this manner passed to the reservoir 69 (FIG. 2) through the conduit 28. The cylinder 10 is thus permitted to lower toward the axle and the strut as a whole is reduced to its initial length to restore the balanced position shown in FIG. 1 whereby the vehicle body is positioned with the prescribed road clearance.

The motor vehicle having the suspension level control system arranged as illustrated in FIG. 2 is thus maintained at a substantially constant level notwithstanding the variation in the amount of load carried by the vehicle body.

Where the strut or suspension unit is provided with the control fluid regulator valve unit 47 as shown in FIG. 1, the height of the vehicle body over the road surface can be adjusted in a manual fashion. If, thus, it is desired that the vehicle have an increased road clearance, the actuating rod 54 of the valve unit 47 should be depressed so as to move the poppet valve 51 to an unseated position. Communication is thus established between the fluid inlet and outlet ports 53 and 55, respectively, through the fluid chamber 52 and the passages 56 and 56'. The fluid inlet port 53 being in communication with the discharge side of the hydraulic pump 65 (FIG. 2), the working liquid is directed into the control fluid chamber 42 through the conduit 49 and passage 48 in the lower portion of the piston rod 15, giving rise to an increase in the liquid pressure in the control fluid chamber 42. The floating piston 41 is consequently moved upwardly, viz., away from the closed lower end of the piston rod 15. This causes the spool valve 23 to move toward the apertured end plug 24 of the sleeve 22 by the compressive force of the spring 39 against the opposing spring force of the spring 38 with a consequent increase in the liquid pressure in the cylinder chamber 11, similarly as described above. The cylinder 10 is thus moved upwardly away from the axle to increase the total length of the strut, similarly as described above. The underbody of the motor vehicle having the level control system illustrated in FIG. 2 can thus be raised over the road surface through manipuration of the control fluid regulator valve unit 47. When a desired road clearance of the vehicle body is reached, the actuating rod 54 should be released so as to permit the poppet valve 51 to be seated by the action of the preload spring 57 and block the communication between the inlet and outlet ports 53 and 55, respectively.

If, conversely, it is desired to have the vehicle body lowered to a certain level, then the actuating rod 54' should be depressed so as to move the poppet valve 51' to a position in which the fluid outlet port 55 is in communication with the drain port 53' through the fluid passage 56'. The liquid obtaining in the control fluid chamber 42 in the piston rod 15 is consequently allowed out of the drain port 53' through the passage 48, conduit 49, fluid outlet port 55, passage 56', and fluid chamber 52'. This results in a decrease in the liquid pressure in the control fluid chamber 42 so that the floating piston 41 subjected to the liquid pressure at its upper face is caused to move downwardly toward the lower end portion of the piston rod 15. This causes the spool valve 23 to move toward the piston 14 by the increased compressive force of the spring 38 against the reduced compressive force of the spring 39 with the consequent decrease in the liquid pressure in the cylinder chamber 11, similarly as described above. The cylinder 10 together with the sleeve 22, valve spool 23 and springs 37 and 38 is thus caused to move downwardly toward the axle with a resultant decrease in the height of the underbody of the motor vehicle. The liquid drained off through the drain port 53' is circulated to the reservoir 69 through the pipeline 68 (FIG. 2). The actuating rod 54' should be released when the desired road clearance is achieved by the vehicle body whereby the fluid communication between the ports 55 and 53' is blocked by the poppet valve 51'.

Figure 3:
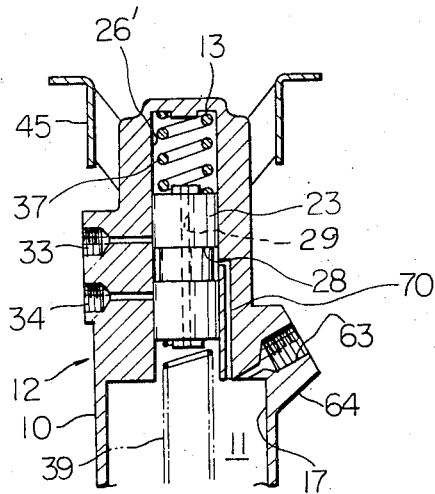
FIG. 3 is a fragmentary longitudinal sectional view showing a modification of the embodiment illustrated in FIG. 1.

FIG. 3 illustrates a modification of the embodiment shown in FIG. 1, wherein like reference numerals designate corresponding parts and locations in the two embodiments.

As seen in FIG. 3, the sleeve 22 and the associated spring 38 are removed and, instead, the valve spool 23 is axially slidably received directly in the cylinder head 12. The construction shown herein thus features significant simplicity as compared with the embodiment shown in FIG. 1. The valve spool 23, moreover, is void of the radial passage 30 and, in lieu thereof, the cylinder head 12 has formed in its thickened wall a passage 70 which is opened at one end to the bore 26' in the cylinder head 12 and at the other to the upper fluid compartment 17. The annular groove 28 in the valve spool 23 is, in this instance, so sized and located as to be in alignment with the upper radial passage 33 in the cylinder head 12 and the passage 70 when the valve spool 23 is moved to the uppermost limit position and with the lower radial passage 34 and passage 70 when the valve spool 23 is moved to the lowermost limit position. When the valve spool 23 is in a neutral position with the opposing forces of the springs 37 and 39 balanced with each other, communication between the radial passages 33 and 34 and the annular groove 28 is blocked by the spaced lands of the valve spool 23.

With the cylinder head 12 thus constructed, when the cylinder 10 is moved upwardly or downwardly relative to the piston in the cylinder chamber 10 due to a change in the amount of load on the vehicle body, either the upper radial port 33 or the lower radial port 34 in the cylinder head 12 is brought into alignment with the annular groove 28 in the valve spool 23. When, thus, the load on the vehicle body increases so as to cause the strut to be contracted in its entirety, the valve spool 23 is moved relative to the cylinder head 12 by the action of the spring 39 against the opposing force of the other spring 37 until the valve spool 23 assumes its uppermost limit position. The annular groove 28 in the valve spool 23 is consequently aligned with the upper radial port or fluid inlet port 33 so as to establish fluid communication between the hydraulic pump 65 (FIG. 2) and the cylinder chamber 11. This gives rise to an increase in the liquid pressure in the cylinder chamber 11 and, as a result, the cylinder 10 is caused to be raised relative to the piston therein until the valve spool 23 reaches the neutral position to permit the vehicle body to restore the predetermined road clearance. If, conversely, the vehicle body carries a reduced amount of load, then the cylinder 10 is moved upwardly relative to the piston so that the valve spool 23 is moved downwardly relative to the cylinder head 12. The annular groove 28 in the valve spool 23 is consequently aligned with the lower radial port or fluid outlet port 34, allowing the liquid in the cylinder chamber 11 to be directed to the reservoir 69 (FIG. 2). The valve spool 23 is returned to the neutral position illustrated in FIG. 3 when the strut is compressed to its proper length and accordingly the vehicle body restores the predetermined road clearance. The suspension control arrangement using the suspension units each constructed as illustrated in FIG. 3 is thus adapted to maintain the vehicle body at a substantially constant level in spite of a change in the amount of load on the vehicle body.

In the event the vehicle wheels are subjected to violent upward and downward vibrations, the valve spool 23 remains at rest by reason of the restriction on the flow of the liquid through the axial passage 29 in the valve spool so that the annular groove 28 in the valve spool is isolated from both of the radial ports 33 and 34 in the cylinder head 12. The variation in the liquid pressure in the cylinder chamber 10 is dampened by the compression of the gas in the gas chamber of the hydropneumatic spring unit (not shown) which was previously described with reference to FIG. 1.

It will now be appreciated from the above description that the level control system or each of the suspension units constituting the level control system according to the present invention are adapted to maintain the vehicle body at a constant level irrespective of the variation in the amount of load on the vehicle body, to permit adjustment of the road clearance depending upon condition of the road surface, and to absorb vertical vibrations of the vehicle wheels, all in efficient and reliable fashions in a simple and compact construction. No meticulous adjustment of the level control system is required when the system as a whole is replaced with a new one. During replacement of a tire, moreover, the vehicle body can be readily raised and lowered to a desired level by the manipulation of the level control fluid regulator valve unit. Thus, the tire can be replaced easily without resort to the use of a jack or other automotive lifting devices. Through proper piping arrangement for the right and left hydropneumatic spring units at the front and rear of the suspension mechanism, pitching and rolling of the vehicle body may be controlled.

The level control fluid regulating arrangement and the hydropneumatic spring unit herein described are rather supplementary to the strut or suspension unit proper and, as such, either or both of them may be removed from the suspension unit if preferred.

What is claimed is:

1. A suspension unit for a motor vehicle of vehicle level adjustable character comprising a cylinder having a cylinder chamber filled with liquid under pressure and a cylinder head formed with axially spaced liquid inlet and outlet ports, said fluid inlet port communicating with a source of liquid under pressure, a piston axially slidable in said cylinder chamber, a piston rod projecting from said piston and extending outwardly from said cylinder through one end of the cylinder opposite to said cylinder head, said piston rod and said cylinder head being connected to a body structure and an axle of the motor vehicle, liquid pressure control means for selectively providing liquid communication between said cylinder chamber and said fluid inlet and outlet ports depending upon the pressure of the liquid in said cylinder chamber, and biasing means for urging said liquid pressure control means to a neutral position isolating said cylinder chamber from said fluid inlet and outlet ports, said cylinder chamber being in communication with said fluid inlet port when said cylinder is moved relative to said piston to cause said suspension unit to contract and with said fluid outlet port when said cylinder is moved relative to said piston to cause said suspension unit to increase its length, and wherein said piston has formed therein a passage providing fluid communication thereacross.

2. A suspension unit for a motor vehicle of vehicle level adjustable character comprising a cylinder having a cylinder chamber filled with liquid under pressure and a cylinder head formed with axially spaced liquid inlet and outlet ports, said fluid inlet port communicating with a source of liquid under pressure, a piston axially slidable in said cylinder chamber, a piston rod projecting from said piston and extending outwardly from said cylinder through one end of the cylinder opposite to said cylinder head, said piston rod and said cylinder head being connected to a body structure and an axle of the motor vehicle, liquid pressure control means for selectively providing liquid communication between said cylinder chamber and said fluid inlet and outlet ports depending upon the pressure of the liquid in said cylinder chamber, and biasing means for urging said liquid pressure control means to a neutral position isolating said cylinder chamber from said fluid inlet and outlet ports, said cylinder chamber being in communication with said fluid inlet port when said cylinder is moved relative to said piston to cause said suspension unit to contract and with said fluid outlet port when said cylinder is moved relative to said piston to cause said suspension unit to increase its length, and wherein said liquid pressure control means includes a spool valve axially slidable in said cylinder head and having an axial passage providing communication thereacross and an annular groove selectively providing said communication between said cylinder chamber and said fluid inlet and outlet ports, and wherein said liquid pressure control means further includes passage means providing communication between said annular groove in said valve spool and said cylinder chamber, and wherein said passage means comprises a sleeve axially slidable in said cylinder head and axially slidably receiving said valve spool therein, said sleeve having formed therein axially spaced fluid inlet and outlet passages which are located intermediate between said fluid inlet and outlet ports is said cylinder head and selectively brought into alignment with said fluid inlet and outlet passages when said cylinder head is moved away from and toward said piston respectively.

3. A suspension unit as claimed in claim 2, in which said biasing means comprises a first preload spring biasing said sleeve toward said piston, a second preload spring biasing said valve spool toward said piston, and a third preload spring biasing said valve spool away from said piston.

4. A suspension unit as claimed in claim 2, in which said passage means further comprises an end plug mounted at an end of said sleeve opposite to said piston and having an apertute formed therein for providing liquid communication across the end plug.

5. A suspension unit as claimed in claim 2, further comprising a stop for limiting the movement of said valve spool toward said piston.

6. A suspension unit for a motor vehicle of vehicle level adjustable character comprising a cylinder having a cylinder chamber filled with liquid under pressure and a cylinder head formed with axially spaced liquid inlet and outlet ports, said fluid inlet port communicating with a source of liquid under pressure, a piston axially slidable in said cylinder chamber, a piston rod projecting from said piston and extendin outwardly from said cylinder through one end of the cylinder opposite to said cylinder head, said piston rod and said cylinder head being connected to a body structure and an axle of the motor vehicle, liquid pressure control means for selectively providing liquid communication between said cylinder chamber and said fluid inlet and outlet ports depending upon the pressure of the liquid in said cylinder chamber, and biasing means for urging said liquid pressure control means to a neutral position isolating said cylinder chamber from said fluid inlet and outlet ports, said cylinder chamber being in communication with said fluid inlet port when said cylinder is moved relative to said piston to cause said suspension unit to contract and with said fluid outlet port when said cylinder is moved relative to said piston to cause said suspension unit to increase its length, and further comprising vehicle level adjusting means for increasing the pressure of the liquid in said cylinder chamber to increase the total length of said suspension unit and decreasing the liquid pressure to reduce the total length of the suspension unit, and wherein said piston rod has an axial bore open at one end to said cylinder chamber and closed at the other by a leading end portion of said piston rod and in which said vehicle level adjusting means comprises a floating piston axially slidable in said bore in the piston rod for defining a control fluid chamber between said floating piston and said leading end portion of the piston rod and a control fluid regulator valve unit for selectively providing liquid communication between said control fluid chamber and said source of liquid under pressure.

7. A suspension unit for a motor vehicle, comprising a cylinder connected to a body structure of said motor vehicle and having a cylinder chamber filled with liquid under pressure and a cylinder head formed with an inlet passage communicating with a source of liquid under pressure and an outlet passage communicating with a reservoir, a piston slidably mounted in said cylinder chamber, a piston rod connected with said piston and mounted on a wheel supporting means of said motor vehicle, liquid pressure control means for selectively providing liquid communication between said cylinder chamber and said inlet passage and between said cylinder chamber and said outlet passage in response to variation in the weight of said vehicle, biasing means for urging said liquid pressure control means to a neutral position to isolate said cylinder chamber from said inlet passage and said outlet passage, said piston and said piston rod having an axial bore open at one end into said cylinder chamber, a floating piston slidably mounted in said bore and defining therein a fluid chamber and connected with said biasing means, and a fluid regulator valve unit for selectively providing liquid communication between said fluid chamber and said source of liquid under pressure.

8. A suspension unit according to claim 7, in which said fluid regulator valve unit comprises a first valve for providing liquid communication between said fluid chamber and said source of liquid under pressure and a second valve for providing liquid communication between said fluid chamber and said reservoir.

9. A suspension unit as claimed in claim 7, further comprising a hydropneumatic spring unit having a casing which is divided by a flexible partition member into a gas chamber filled with a gas under pressure and a liquid chamber communicating with said cylinder chamber.

10. A suspension unit as claimed in claim 7, in which said liquid pressure control means includes a spool valve axially slidable in said cylinder head and having an axial passage providing communication thereacross and an annular groove selectively providing said communication between said cylinder chamber and said fluid inlet and between said cylinder chamber and said outlet port.

11. A suspension unit according to claim 10, in which said spool valve has a passage providing liquid communication between said axial passage and said annular groove.

12. A suspension unit as claimed in claim 10, in which said liquid pressure control means further including passage means selectively providing communication between said annular groove in said spool valve and said inlet passage and between said annular groove and said outlet passage.

13. A suspension unit as claimed in claim 12, in which said passage means comprises a sleeve slidably mounted in said cylinder head and slidably receiving said spool valve therein, said sleeve having formed therein first and second passages which are spaced from each other and are located intermediate between said inlet and outlet passages in said cylinder head and selectively brought into alignment with said inlet and outlet passages when said sleeve is moved away from and toward said piston respectively.

14. A suspension unit as claim in claim 13, in which said biasing means comprises a first preload spring biasing said sleeve toward said floating piston, a second preload spring biasing said spool valve toward said floating piston, and a third preload spring biasing said spool valve away from said floating piston.

15. A suspension unit as claim in claim 13, in which said passage means further comprises an end plug mounted at an end of said sleeve opposite to said piston and having formed therein an aperture for providing liquid communication across the end plug.

16. A suspension unit as claimed in claim 13, further comprising a stop for limiting the movement of said spool valve toward said piston.

17. A suspension unit as claimed in claim 12, in which said passage means comprises a wall portion of said cylinder head, said wall portion having formed therein a passage providing said communication between said annular groove in said spool valve and said cylinder chamber.

18. A suspension unit as claimed in claim 17, in which said biasing means comprises a first preload spring biasing said spool valve toward said floating piston and a second preload spring biasing said spool valve away from said floating piston.

19. A suspension unit as claimed in claim 7, in which said piston has formed therein a passage providing liquid communication thereacross.

* * * * *